(12) United States Patent
Chang et al.

(10) Patent No.: US 8,350,794 B2
(45) Date of Patent: Jan. 8, 2013

(54) DISPLAY DEVICE HAVING CONCURRENTLY DRIVABLE MULTIPLE DISPLAY MATERIAL LAYERS, AND CIRCUITRY FOR AND METHOD OF DRIVING THE SAME

(75) Inventors: Yun-Shuo Chang, Hsinchu (TW); Heng-Yin Chen, Hsinchu (TW); Tai-Ann Chen, Hsinchu (TW); Chiao-Nan Huang, Hsinchu (TW)

(73) Assignee: Industrial Technology Research Institute (TW)

( * ) Notice: Subject to any disclaimer, the term of this patent is extended or adjusted under 35 U.S.C. 154(b) by 705 days.

(21) Appl. No.: 12/479,557

(22) Filed: Jun. 5, 2009

(65) Prior Publication Data

US 2010/0309180 A1 Dec. 9, 2010

(51) Int. Cl.
*G09G 3/36* (2006.01)
(52) U.S. Cl. ........................................................ 345/89
(58) Field of Classification Search .................. 345/208, 345/89
See application file for complete search history.

(56) References Cited

U.S. PATENT DOCUMENTS

| | | | |
|---|---|---|---|
| 7,145,538 B2* | 12/2006 | Yamakawa et al. | 345/96 |
| 7,737,928 B2 | 6/2010 | Huang et al. | |
| 2007/0139299 A1* | 6/2007 | Huang et al. | 345/3.1 |
| 2007/0159574 A1 | 7/2007 | Burberry et al. | |

OTHER PUBLICATIONS

Rybalochka, A. et al., "Bistable Cholesteric Reflective Displays: Two-Level Dynamic Drive Schemes", Journal of the SID Dec. 2, 2004, pp. 165-171.
Shiyanovskaya, Irna, et al., "6.4: Single Substrate Coatable Multicolor Cholesteric Liquid Crystal Displays", SID 2007 Digest, pp. 65-68.

* cited by examiner

*Primary Examiner* — Chanh Nguyen
*Assistant Examiner* — John Kirkpatrick
(74) *Attorney, Agent, or Firm* — Lowe Hauptman Ham & Berner, LLP

(57) ABSTRACT

In a multi layer display device, at least two display material layers are concurrently driven while cross talk prevention and/or image quality adjustment is achievable by adjusting at least one of voltage, pulse width or repetition rate of the driving waveforms.

21 Claims, 8 Drawing Sheets

US 8,350,794 B2

DISPLAY DEVICE HAVING CONCURRENTLY DRIVABLE MULTIPLE DISPLAY MATERIAL LAYERS, AND CIRCUITRY FOR AND METHOD OF DRIVING THE SAME

BACKGROUND

The disclosure generally relates to flat panel displays and, particularly, to flat panel displays with at least a common electrode layer shared by multiple display material layers.

Flat panel displays have recently become increasingly popular. Generally, a flat panel display includes a flat panel in which a layer of display material is sandwiched between two electrode layers. When an appropriate voltage is applied across the electrode layers, the display material layer generates light (e.g., in plasma or OLED—Organic light emitting displays) or modulates light impinging thereon (e.g., liquid crystal displays) to cause a desired image to be displayed.

When a flat panel display includes several display material layers, e.g., each for a different color, wherein the display material layers are stacked one on top another, the number of electrode layers also increases, resulting in a thicker and more complex display structure. It is, therefore, desirable to reduce the number of electrodes layers, while maintaining proper operation of the flat panel display. An approach has been proposed in U.S. Patent Application Publication No. 2007/0159,574 and U.S. Patent Application Publication No. 2007/0139,299 which are incorporated by reference herein in their entirety.

The above-mentioned U.S. Patent Application Publications suggested to use a common electrode layer between adjacent liquid crystal layers to drive the adjacent liquid crystal layers. The U.S. Patent Application Publications disclosed in general that the liquid crystal layers that share the common electrode layer can be driven sequentially and/or concurrently, while crosstalk to the other liquid crystal layers that are not being driven can be prevented. There is, however, little detail in the U.S. Patent Application Publications as to how liquid crystal layers can be concurrently driven while preventing cross-talk to the other liquid crystal layers.

SUMMARY

In one or more embodiments, a display device comprises: a substrate; a first driving electrode layer on the substrate; a first display material layer on the first electrode layer; a common electrode layer on the first display material layer; a second display material layer on the common electrode layer; a second driving electrode layer on the second display material layer; and a controller coupled to said first and second driving electrode layers and the common electrode layer for concurrently driving the first and second display material layers by based on image signals inputted for the first and second display material layers, generating first and second writing waveforms for the first and second driving electrode layers, respectively, and a scanning waveform for the common electrode layer; adjusting at least one of the generated waveforms based on at least another one of the generated waveforms for at least one of cross-talk prevention or image quality adjustment; and placing the adjusted and/or generated waveforms on the respective electrode layers to concurrently drive the first and second display material layers while achieving said at least one of cross-talk prevention or image quality adjustment.

In one or more embodiments, a controller is provided for driving a display device that comprises a substrate, a first driving electrode layer on the substrate, a first display material layer on the first electrode layer, a common electrode layer on the first display material layer, a second display material layer on the common electrode layer, a second driving electrode layer on the second display material layer. The controller is adapted to be coupled to said first and second driving electrode layers and the common electrode layer and configured for concurrently driving the first and second display material layers by based on image signals inputted for the first and second display material layers, generating first and second writing waveforms for the first and second driving electrode layers, respectively, and a scanning waveform for the common electrode layer; adjusting at least one of the generated waveforms based on at least another one of the generated waveforms for at least one of cross-talk prevention or image quality adjustment; and placing the adjusted and/or generated waveforms on the respective electrode layers to concurrently drive the first and second display material layers while achieving said at least one of cross-talk prevention or image quality adjustment.

In one or more embodiments, a method is provided for driving a display device that comprises a substrate, a first driving electrode layer on the substrate, a first display material layer on the first electrode layer, a common electrode layer on the first display material layer, a second display material layer on the common electrode layer, a second driving electrode layer on the second display material layer. The method comprises: based on image signals inputted for the first and second display material layers, generating first and second writing waveforms for the first and second driving electrode layers, respectively, and a scanning waveform for the common electrode layer; adjusting at least one of the generated waveforms based on at least another one of the generated waveforms for at least one of cross-talk prevention or image quality adjustment; and placing the adjusted and/or generated waveforms on the respective electrode layers to concurrently drive the first and second display material layers while achieving said at least one of cross-talk prevention or image quality adjustment.

In one or more embodiments, a computer-readable medium contains therein instructions which, when executed, cause a controller to perform a method of driving a display device that comprises a substrate, a first driving electrode layer on the substrate, a first display material layer on the first electrode layer, a common electrode layer on the first display material layer, a second display material layer on the common electrode layer, a second driving electrode layer on the second display material layer, said method comprising: based on image signals inputted for the first and second display material layers, generating first and second writing waveforms for the first and second driving electrode layers, respectively, and a scanning waveform for the common electrode layer; adjusting at least one of the generated waveforms based on at least another one of the generated waveforms for at least one of cross-talk prevention or image quality adjustment; and placing the adjusted and/or generated waveforms on the respective electrode layers to concurrently drive the first and second display material layers while achieving said at least one of cross-talk prevention or image quality adjustment.

DESCRIPTION OF THE DRAWINGS

One or more embodiments are illustrated by way of example, and not by limitation, in the figures of the accompanying drawings, wherein elements having the same reference numeral designations represent like elements throughout.

DETAILED DESCRIPTION

Figure 1:
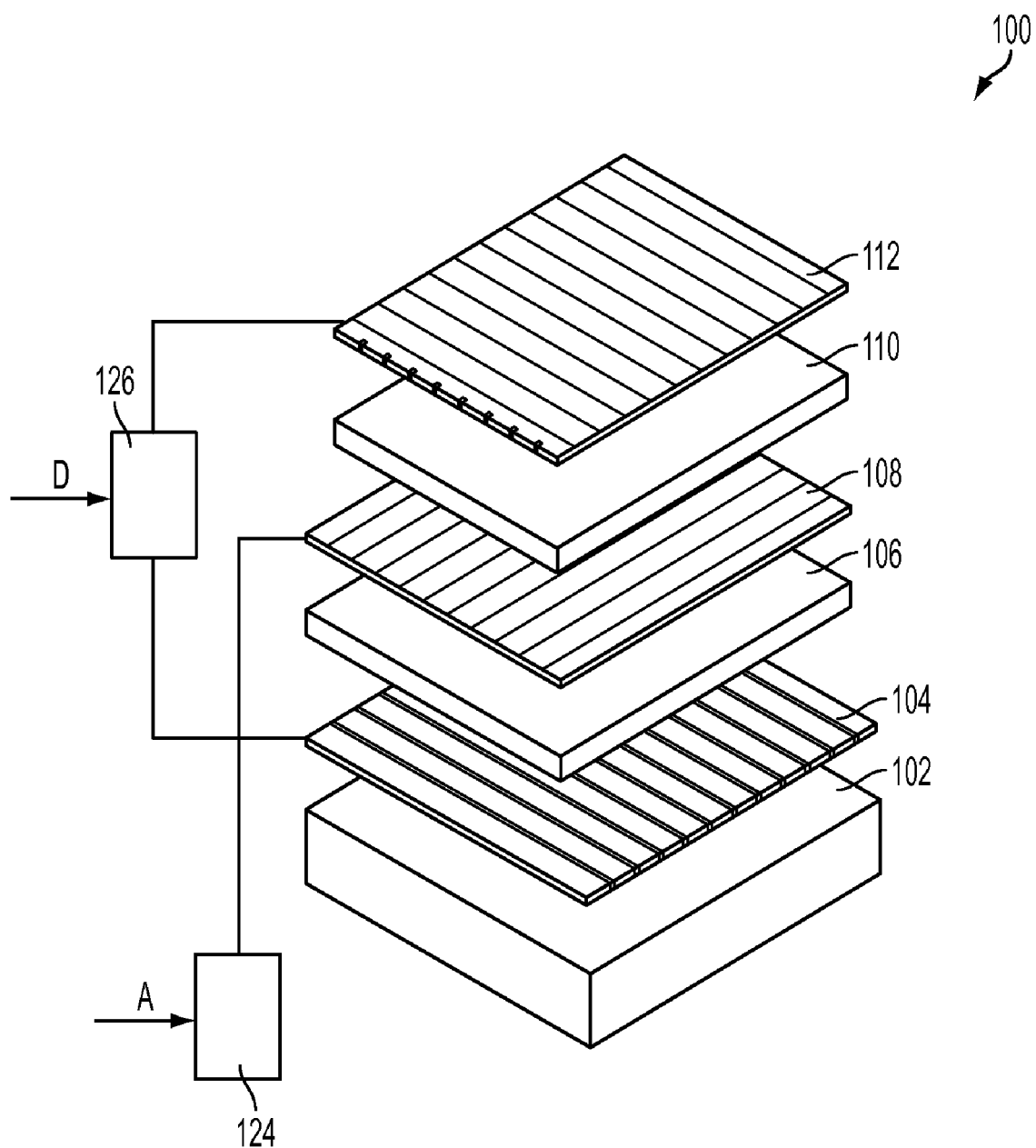
FIG. 1 is a perspective, exploded view of a display structure for use in one or more embodiments.

FIG. 1 is a perspective, exploded view of a display structure 100 for use in one or more embodiments. Display structure 100 comprises a substrate 102, a first electrode layer 104 on substrate 102, a first display material layer 106 on first electrode layer 104, a second electrode layer 108 on first display material layer 106, a second display material layer 110 on second electrode layer 108, a third electrode layer 112 on second display material layer 110 etc. Another protective substrate (not shown) is placed on the top electrode layer (112 in FIG. 1). Each display material layer, e.g., 106, 108, is sandwiched between a pair of adjacent electrode layers, e.g., 104/108 and 108/112. Display structure 100 in some embodiments comprises more than two, e.g., three or more, display material layers. First display material layer 106 and second display material layer 110 share a common electrode layer, i.e., second electrode layer 108, meaning that second electrode layer 108 is used to drive both first display material layer 106 and second display material layer 110. However, it is not necessary that all display material layers in display structure 100 have a shared electrode layer. In some embodiments, at least one display material layer has its own pair of electrode layers which are not shared with any other display material layers.

Each electrode layer, comprises a plurality of patterned conductors which, in some embodiments, are stripe-shaped as exemplarily shown in FIG. 1. The conductors in adjacent electrode layers are oriented in different directions and to cross each other, defining at their intersections a plurality of pixels. In the specifically illustrated embodiment of FIG. 1, first electrode layer 104 and third electrode layer 112 comprise column electrodes (or data electrodes) whereas second electrode layer 108 comprises row electrodes (or scan/address electrodes).

The column or data electrodes are connected to a data driver 126, whereas the row or scan/address electrodes are conned to a scanning/address driver 124. Scanning/address driver 124 and data driver 126 are connected to receive image signals for driving display structure 100 to display desired images. Image signals comprise scanning/address signals A supplied to scanning/address driver 124 for selecting or enabling the pixel(s) to display an image in a given frame period, and data signals D supplied to data driver 126 for causing the selected/enabled pixel(s) to display the image.

The display material layers in display device 100, in accordance with some embodiments, comprise liquid crystal layers. However, other display materials, e.g., light emitting materials such as those for use in plasma and OLED devices are not excluded.

Each liquid crystal layers in display device 100 is filled with liquid crystal material(s) that has at least two different states corresponding to a bright state and a dark state of pixels of display device 100. The liquid crystal material, in accordance with some embodiments, also has a plurality of intermediate states between the bright and dark states to display various grey levels. By controlling the voltage applied to the liquid crystal material via the electrode layers on opposite sides of the liquid crystal layer, the liquid crystal material can be driven from one state to another.

In accordance with one or more embodiments, the liquid crystal material in one or more of the liquid crystal layers of display structure 100 comprises a cholesteric liquid crystal material, which is a bi-stable material that can be stable at a high reflectance state or a low reflectance state. Other liquid crystal materials are, however, not excluded.

In particular, a cholesteric liquid crystal material can be driven to any of a planar state corresponding to the bright state of the display, a focal conic state corresponding the dark state of the display, and an intermediate state between the planar state and the focal conic state by adjusting a driving voltage applied to the cholesteric liquid crystal material. Once the cholesteric liquid crystal material has been driven to one of the above-mentioned states, it tends to stay in that state even if the driving voltage is removed. Therefore, cholesteric liquid crystal displays can retain the display image without any applied power which is required when the image is to be updated. Such displays are thus attractive, among other things, due to their low power consumption.

Figure 2:
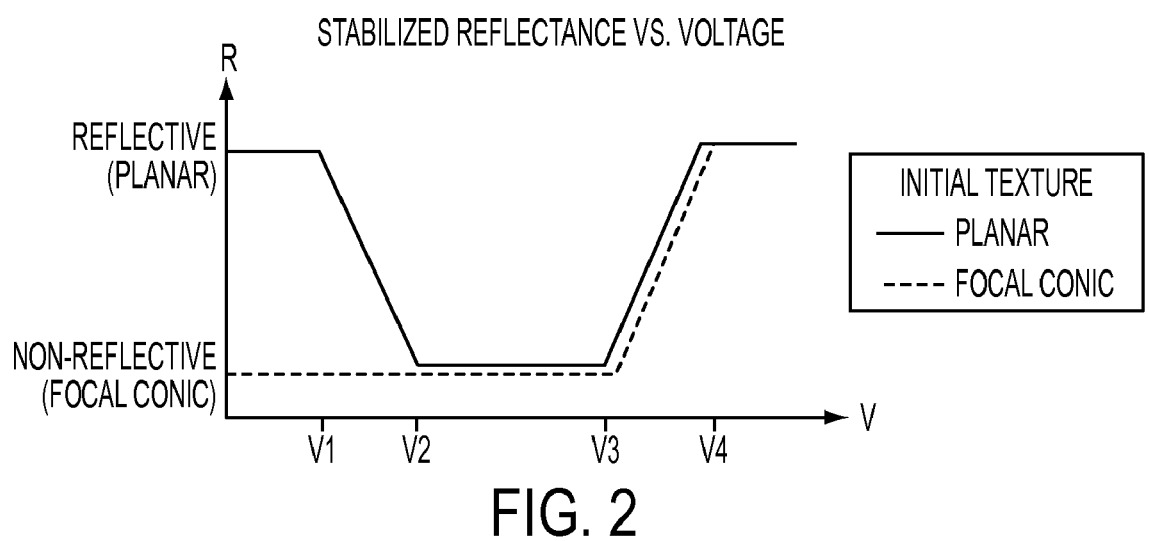
FIG. 2 is a reflectance-voltage characteristic of a cholesteric liquid crystal material.

FIG. 2 is a reflectance-voltage characteristic of a cholesteric liquid crystal material. Such reflectance-voltage characteristic varies from one cholesteric liquid crystal material to another cholesteric liquid crystal material, and depends at least on the composition and/or the thickness of the cholesteric liquid crystal material. When a sufficiently high voltage (e.g., higher than V4) is applied across the cholesteric liquid crystal material, the cholesteric liquid crystal material will enter a homeotropic state. Depending on how the voltage is removed, i.e., quickly or slowly, the cholesteric liquid crystal material will further move to either the planar state or the focal conic state. Specifically, when the voltage is removed quickly, the cholesteric liquid crystal material enters the planar state in which incident light will be reflected by the cholesteric liquid crystal material. The characteristic of the cholesteric liquid crystal material when it is initially set in the planar state is depicted as the solid line in FIG. 2. When the voltage is removed slowly, the cholesteric liquid crystal material enters the focal conic state in which incident light will be transmitted by the cholesteric liquid crystal material. The characteristic of the cholesteric liquid crystal material when it is initially set in the focal conic state is depicted as the broken line in FIG. 2.

As can be seen in FIG. 2, once the cholesteric liquid crystal material has been initially set to the planar state, any driving voltage less than V1 will not cause the cholesteric liquid crystal material to change its planar or high-reflectance state.

When a pulse of a voltage greater than V1 is applied across the cholesteric liquid crystal material (that has been initially set to the planar state) and then removed, the cholesteric liquid crystal material is moved to an intermediate state (between V1 and V2) between the planar (high-reflectance) state and the focal conic (low-reflectance) state, depending on the total power delivered by the pulse (i.e., voltage amplitude and pulse width). The higher the pulse power (higher voltage amplitude and/or longer pulse width) is, the closer the intermediate state will be to the focal conic state. The intermediate states between V1 and V2 define numerous gray scale levels that can be displayed by the cholesteric liquid crystal material.

If the pulse power is sufficiently large, the cholesteric liquid crystal material will be moved to the focal conic state (between V2 and V3) where incident light is allowed to pass through the cholesteric liquid crystal material. If the material underlying the cholesteric liquid crystal material, e.g., substrate 102, is light absorptive, the pixel will appear dark. A further increase in the pulse power will cause the cholesteric liquid crystal material to move (between V3 and V4) toward the planar state which is reached at V4.

Similar changes in reflectance of the cholesteric liquid crystal material are observed for the broken line characteristics, when the cholesteric liquid crystal material is initially set to the focal conic state, and will not be described herein.

The specific description herein below will focus on the reflectance changes for a cholesteric liquid crystal material that has been initially set to the planar state and is being driven to a reflectance state corresponding to the driving voltage ranging between 0 and V3. However, the disclosure is also applicable to a cholesteric liquid crystal material that has been initially set to the focal conic state and/or other driving voltage ranges.

Figure 3:
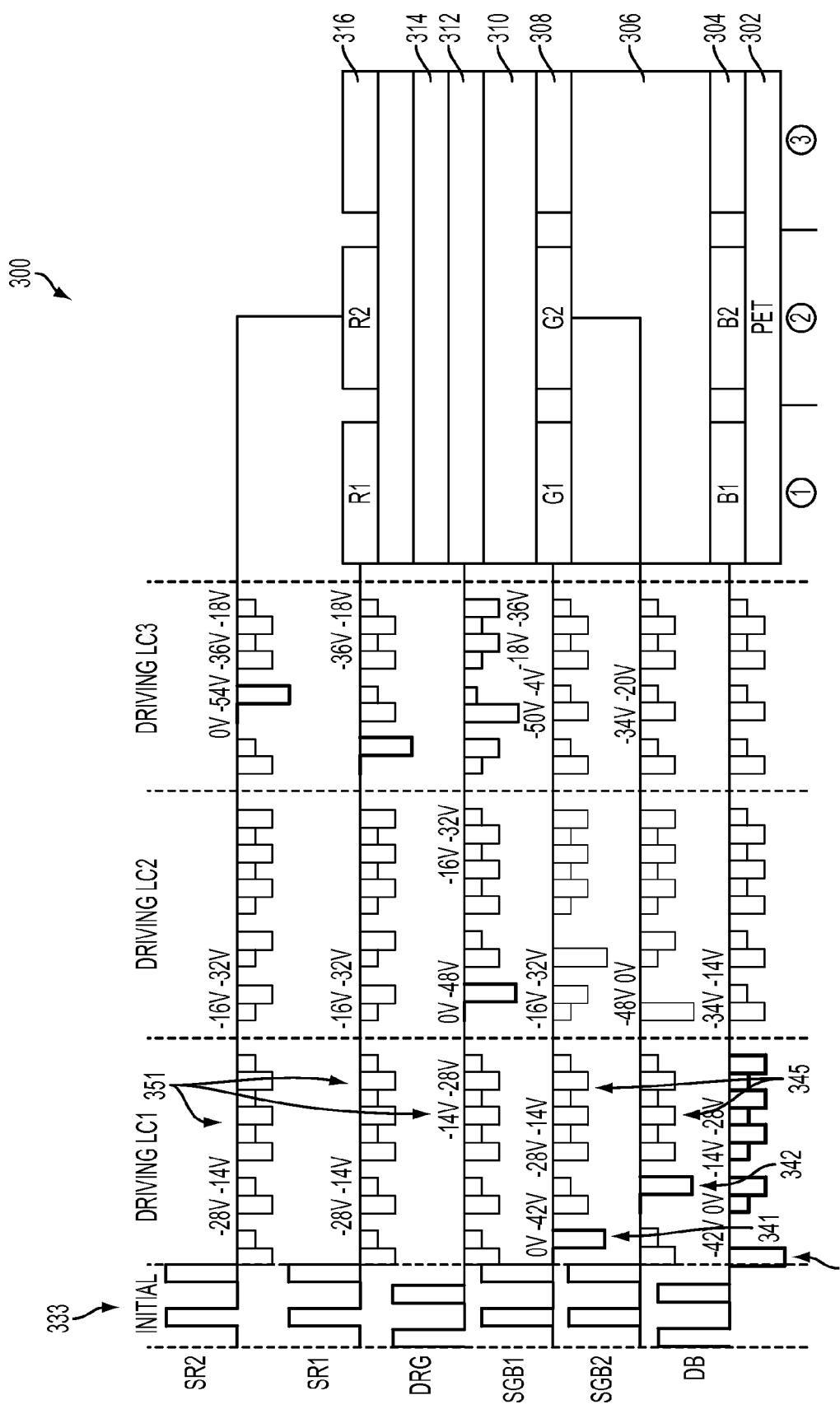
FIG. 3 is a schematic cross-sectional view of a three-layer liquid-crystal display device and exemplary waveforms used to sequentially drive the display device.

FIG. 3 is a schematic cross-sectional view of a three-layer liquid-crystal display device 300 and exemplary waveforms used to sequentially drive display device 300. Display device 300 is similar to display structure 100 in that it comprises a substrate 302 (e.g., made of PET—polyethylene terephthalate), a first (column/data) electrode layer 304 on substrate 302, a first display material layer 306 on first electrode layer 304, a second electrode layer 308 on first display material layer 306, a second display material layer 310 on second electrode layer 308, a third electrode layer 312 on second display material layer 310, a third display material layer 314 on third electrode layer 312, and a fourth electrode layer 316 on third display material layer 314 etc. Another protective substrate (not shown) is placed above the top electrode layer, i.e., 316.

Liquid crystal layers 306, 310, 314, which may be hereinafter referred to as LC1, LC2, LC3, respectively, comprise cholesteric liquid crystal materials configured to reflect, in states other than the focal conic state, light of different, predetermined wavelengths. For example, LC1 is configured to reflect blue light, LC2 is configured to reflect green light, LC3 is configured to reflect red light. Other arrangements, e.g., other orders in which the red, green blue liquid crystal layers are stacked and/or other colors, are not excluded.

Three pixels 1, 2, 3 are exemplarily depicted in FIG. 3. Each pixel comprises 3 sub-pixels stacked one on top another and corresponding to three colors of the respective liquid crystal layers. Two pixels 1-2 will be described in detail herein below. The respective sub-pixels are R1, R2, G1, G2 and B1, B2.

Electrode layers 304, 312 are data/column electrodes and are connected to a data driver, similar to 126 in FIG. 1. Electrode layers 308, 316 are scanning electrodes and are connected to a scanning/address driver, similar to 124 in FIG. 1. In the electrode layer 316, the row electrodes corresponding to sub-pixels R1, R2 are coupled to receive (scanning-red) waveforms SR1, SR2, respectively. In the electrode layer 308, the row electrodes corresponding to sub-pixels G1, G2 are coupled to receive (scanning-green-blue) waveforms SGB1, SGB2, respectively. In the electrode layer 312, the column electrode corresponding to sub-pixels R1/G1, and R2/G2 is coupled to receive (data-red-green) waveform DRG. In the electrode layer 304, the column electrode corresponding to sub-pixels B1 and B2 is coupled to receive (data-blue) waveform DB.

LC1, LC2, LC3 are sequentially driven in three separate sub-frame periods Driving LC1, Driving LC2 and Driving LC3 which together with an initial period define a frame period for displaying a frame on display device 300. Specifically, the entire display device 300 is first written to the planar state by at least one initial pulse 333. As discussed above with respect to FIG. 2, initial pulse 333 is sufficiently high and quickly removed to set all pixels, hence all sub-pixels, of the entire display device 300 in the planar state between 0 and V1 in FIG. 2.

In the first sub-frame period Driving LC1, sub-pixels B1, B2 are selected by scanning pulses 341, 342 of waveforms SGB1, SGB2 supplied to the respective row electrodes of electrode layer 308. Sub-pixel B1 is written by writing pulse 343 which, together with scanning pulse 341, defines across LC1 in sub-pixel B1 a voltage higher than a threshold voltage, e.g., 14V, (similar to V1 in FIG. 2). Such voltage is sufficient to change the cholesteric liquid crystal material in LC1 of sub-pixel B1 toward the focal conic state to display a desired grayscale of the respective color, i.e., blue. Writing pulse 343 and scanning pulse 341, however, do not cause higher than threshold voltages in the other pixels which remain in the planar state. Sub-pixel B2 as well as other sub-pixels of LC1 are written similarly.

In the second and third sub-frame periods Driving LC2 and Driving LC3, sub-pixels G1, G2 and then R1, R2 are sequentially addressed and written in similar manner, i.e., the selected sub-pixels change their reflectance toward the focal conic state whereas the unselected sub-pixels maintain the planar state. Once the entire display device 300 has been updated, the process is repeated with a new set of initial pulses 333 to display the next frame.

Since the liquid crystal layers share one or more electrode layers, e.g., electrode layers 308, 312 cross-talk should be prevented. For example, when LC1 is driven by voltages across electrode layers 308 and 304, since electrode layer 308 is shared between LC1 and LC2, undesirable voltages are also placed across LC2 due to the presence of scanning waveforms, such as SGB1, SGB2, on electrode layer 308. Such undesirable voltages are minimized or nullified by supplying similar waveforms to electrode layer 312 on the other side of LC2. Since waveforms are now applied to electrode layer 312 which is shared between LC2 and LC3, such waveforms are further minimized or nullified by supplying similar waveforms to electrode layer 316 on the other side of LC3. Thus, to prevent cross-talk due to the presence of waveforms SGB1, SGB2 in the first sub-frame period Driving LC1, auxiliary pulses 351 are introduced in waveforms DRG, SR1, SR2. Auxiliary pulses 351 can be identical to respective pulses 341 and/or 342 and/or 345 to completely nullify pulses 341 and/or 342 and/or 345 (i.e., voltages across LC2 and/or LC3 will be zero or close to zero), or sufficient close to pulses 341 and/or 342 and/or 345 so that the voltages across LC2 and/or LC3 will be insufficient to cause changes in the reflectance of the sub-pixels of LC2, LC3 which are not being addressed. Similarly, cross-talk can be avoided in LC1 and LC3 while LC2 is being addressed, and in LC1 and LC2 while LC3 is being addressed.

In the above disclosed sequential driving, for a three-layer liquid crystal display device such as display device 300, it takes three sub-frame periods for the liquid crystal display device to display a complete frame. When the number of liquid crystal layers of the liquid crystal display device increases, the time required to sequentially drive the liquid crystal display device increases directly proportional to the number of liquid crystal layers.

Figure 4:
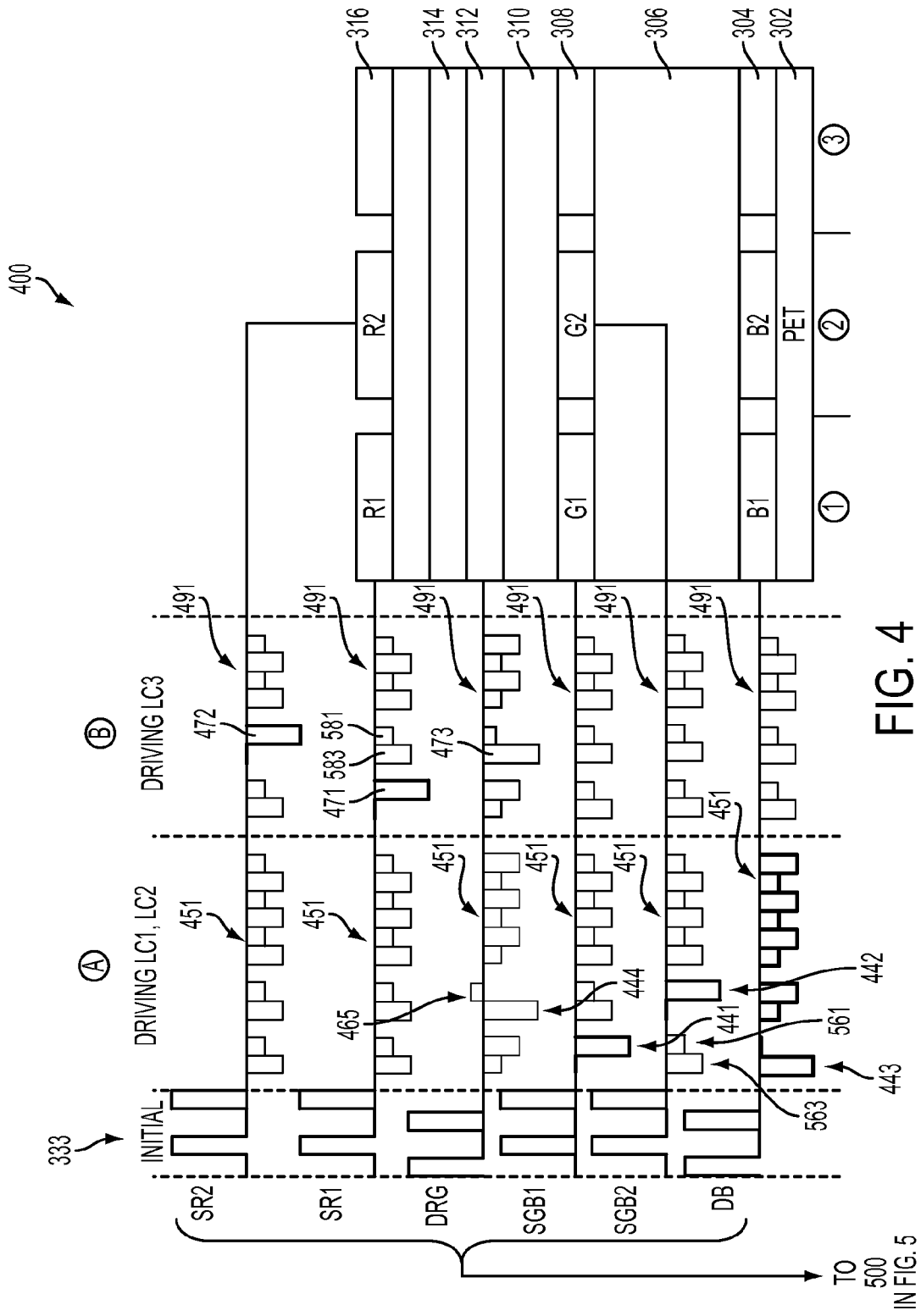
FIG. 4 is a schematic cross-sectional view of a three-layer liquid-crystal display device and exemplary waveforms used to concurrently drive at least two liquid crystal layers of the display device, in accordance with one or more embodiments.

FIG. 4 is a schematic cross-sectional view of a three-layer liquid-crystal display device 400 and exemplary waveforms used to concurrently drive at least two liquid crystal layers of display device 400. Display device 400 is similar to display device 300, except for the scanning and/or addressing circuitry 500 that will be described herein below with respect to FIG. 5.

In one or more embodiments, at least LC1 and LC2 are concurrently driven in a single sub-frame period A, while LC3 is separately driven in the subsequent sub-frame period B. It is not excluded that LC2 and LC3 are concurrently driven or that all LC1, LC2 and LC3 are driven together. The time required for display device 400 to update the image is therefore shortened compared to display device 300.

Similar to display device 300, the entire display device 400 is first written to the planar state by at least one initial pulse 333.

In the first sub-frame period A, sub-pixels B1 and G1 are concurrently selected by the same scanning pulse 441. Likewise, sub-pixels B2 and G2 are concurrently selected by the same scanning pulse 442. In some embodiments, each of the scanning pulses comprises several smaller pulses configured to select sub-pixels B1 and G1 (or B2 and G2) at slightly different timings. Such embodiments are still considered to concurrently address the respective sub-pixels of LC1 and LC2 because the liquid crystal layers are addressed together within the same sub-frame period.

Sub-pixel B1 is written by writing pulse 443 which, together with scanning pulse 441, defines across LC1 in sub-pixel B1 a voltage higher than a threshold voltage, e.g., 14V, (similar to V1 in FIG. 2). Such voltage is sufficient to change the cholesteric liquid crystal material in LC1 of sub-pixel B1 toward the focal conic state to display a desired grayscale of the respective color, i.e., blue. Writing pulse 443 and scanning pulse 441, however, do not cause higher than threshold voltages in the other pixels which remain in the planar state. Sub-pixel G1 is written (not shown) together with scanning pulse 441 in a similar manner.

Sub-pixel G2 is written by writing pulse 444 which, together with scanning pulse 442, defines across LC2 in sub-pixel G2 a voltage higher than a threshold voltage, e.g., 16V, (similar to V1 in FIG. 2). Such voltage is sufficient to change the cholesteric liquid crystal material in LC2 of sub-pixel G2 toward the focal conic state to display a desired grayscale of the respective color, i.e., green. Writing pulse 444 and scanning pulse 442, however, do not cause higher than threshold voltages in the other pixels which remain in the planar state.

The other sub-pixels of LC1 and LC2 are written similarly.

In the subsequent sub-frame period B, sub-pixels R1, R2 are addressed and written in similar manner, i.e., the selected sub-pixels change their reflectance toward the focal conic state whereas the unselected sub-pixels maintain the planar state. Once the entire display device 400 has been updated, the process is repeated with a new set of initial pulses 333 to display the next frame.

Again, cross-talk between liquid crystal layers or between pixels should be prevented. In one or more embodiments, auxiliary pulses 451 similar to pulses 351 of FIG. 3 are added to the respective waveforms to prevent cross-talk by keeping the voltage(s) across the liquid crystal layers, that are not being addressed, below their respective threshold voltages (similar to V1 in FIG. 2). Additionally or alternatively, one or more auxiliary pulse, such as 465, is added, in accordance with one or more embodiments, to the waveforms of one or more of the electrode layers of the liquid crystal layers being addressed, e.g., electrode layer 312. In some embodiments, the voltage(s) applied across the liquid crystal layers has alternating polarity in order to prevent undesirable deterioration of the liquid crystal material.

For example, for LC1 with a threshold voltage (V1 in FIG. 2) of 14V, scanning pulses 441, 442 of about 42V are applied to select sub-pixels B1, B2, respectively. Writing pulse 443 of about 42V is applied to write sub-pixel B1 together with scanning pulse 441. The voltage applied by pulses 443 and 441 across LC1 has alternating polarity and an amplitude of about 42V which is greater than the threshold voltage 14V of LC1 and, hence, causes the cholesteric liquid crystal material of LC1 in sub-pixel B1 to change its state from the planar state (between 0 and V1 in FIG. 2) toward the focal conic state (between V2 and V3 in FIG. 2). Depending on the pulse power defined by the voltage (e.g., 42V) and the pulse width, the cholesteric liquid crystal material of LC1 in sub-pixel B1 will assume an intermediate reflectance state (between V1 and V2 in FIG. 2) or the focal conic state.

To prevent cross-talk from sub-pixel B1 being addressed to adjacent sub-pixel B2, an auxiliary pulse 563 is added to the scanning waveform SGB2 of sub-pixel B2, to bring the voltage across LC1 in sub-pixel B2 during the addressing of sub-pixel B1 to about below the threshold voltage of 14V. For this purpose, auxiliary pulse 563 has a voltage of about 28V. Another auxiliary pulse 561 of about 14V is added, in some embodiments, to create across sub-pixel B2 an alternating voltage of about 14V which is insufficient to change the reflectance state of sub-pixel B2 while preventing both cross-talk between adjacent pixels and deterioration of the cholesteric liquid crystal material.

A series 451 of pulses 563, 561 is added to at least one of the scanning waveforms SGB1, SGB2 of electrode layers 308 for the same or similar purposes. Such or similar series 451 is also added to at least one of the waveforms of the other electrode layers, e.g., 304, 312, 316, to prevent cross-talk between liquid crystal layers.

To address LC2 which has a slightly higher threshold voltage of about 16V, a slightly higher writing pulse 444 of about 44V is used.

To address LC3 which has a further higher threshold voltage of about 18V, scanning pulses 471, 472 of about 54V are used together with writing pulse 473 of about 50V. A series 491 of pulses 583 (about 36V), 581 (about 18V) is added to at least one of the scanning waveforms SR1, SR2 of electrode layers 316 to prevent cross-talk between adjacent pixels by alternating pulses having less-than-threshold voltages which also prevent deterioration of the cholesteric liquid crystal material. Such or similar series 491 is also added to at least one of the waveforms of the other electrode layers, e.g., 308, 312, 304, to prevent cross-talk between liquid crystal layers.

If two or more liquid crystal layers of display device 400 have the same or similar reflectance-voltage characteristics, especially threshold voltages, it is easier to calculate the auxiliary pulse series 451, 491.

The above numeric ranges are given as examples only. Other cholesteric liquid crystal materials with different voltage ranges and/or reflectance-voltage characteristics are used in further embodiments.

The above disclosed cross-talk prevention principle is applicable to both situations where the threshold voltages of the liquid crystal layers are different and situations where the threshold voltages of the liquid crystal layers are the same.

Figure 5:
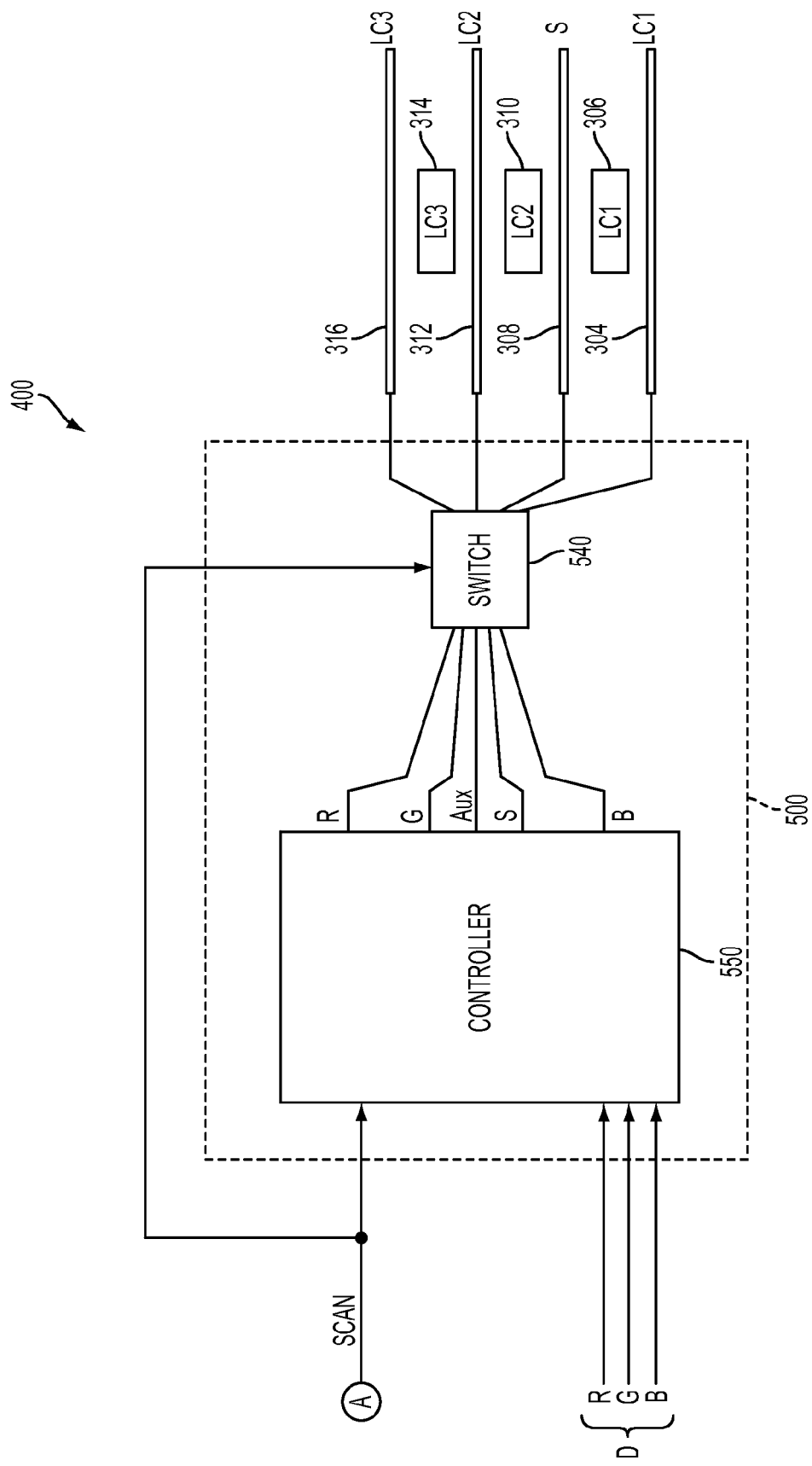
FIG. 5 is a schematic view showing scanning and/or addressing circuitry in accordance with one or more embodiments.

FIG. 5 is a schematic view showing scanning and/or addressing circuitry 500 which, in accordance with one or more embodiments, comprises a controller 550 and a switch 540. Controller 550 is coupled to receive image signals from an external source, e.g., a graphic card of a computer or a tuner of a TV etc. The image signals are similar to those discussed with respect to FIG. 1, e.g., scanning signals S and data signals D, the latter comprising information on gray scale levels of various colors to be displayed by the respective liquid crystal layers of display device 400. Outputs of controller 550 are connected to inputs of switch 540 which, in accordance with the scanning signals, selectively transmits the outputs of controller 550 to the respective electrode layers 304, 308, 312 and 316.

Specifically, in the first sub-frame period A (FIG. 4), the scanning signals A is outputted at output S of controller 550 and then supplied by switch 540 to electrode layer 308. Gray scale level information in green and blue signals G and B of data signals D, in some embodiments, are converted by controller 550 to corresponding waveforms (e.g., SGB1, SGB2 in FIG. 4) and outputted respectively at outputs G and B to be then transmitted by switch 540 to respective electrode layers 304, 312. In some embodiments, controller 550 further adjusts the waveforms corresponding to inputted green and/or blue signals before outputting to avoid cross-talk as described herein. Controller 550 also generates, based on at least the waveform outputted at output G, auxiliary pulses at output Aux to be then transmitted by switch 540 to electrode layer 316 for cross-talk prevention.

In the second sub-frame period B (FIG. 4), the scanning signals A is again outputted at output S of controller 550 to be supplied by switch 540, this time, to electrode layer 316. Gray scale level information in red signal R of data signals D, in some embodiments, is converted by controller 550 to corresponding waveforms (e.g., SR1, SR2 in FIG. 4) and outputted respectively at output R to be then transmitted by switch 540 to respective electrode layer 312. In some embodiments, controller 550 further adjusts the waveform to be outputted at output R to avoid cross-talk as described herein. Controller 550 also generates, based on at least the waveform outputted at output R, auxiliary pulses at output Aux to be then transmitted by switch 540 to one or more of electrode layers 304, 308 for cross-talk prevention.

Other arrangements are not excluded. For example, in one or more embodiments, scanning signals A are directly supplied to switch 540 without going through controller 550. In one or more embodiments, switch 540 is eliminated or incorporated in controller 550. In one or more embodiments, controller 550 further adjusts the respective waveforms to prevent cross-talk based not only on the data signals D but also on the scanning signals A. In some embodiments, controller 550 is adapted to drive display device 300 to add auxiliary pulses such as 351 on the waveforms of the respective electrode layers.

In some embodiments, scanning and/or addressing circuitry 500 including controller 550 and/or switch 540 includes a hardware platform, such as chips or electronics or logics, which is hardwired to perform the functions described herein. In further embodiments, scanning and/or addressing circuitry 500 including controller 550 and/or switch 540 includes a hardware platform, such as a processor or chip coupled with a memory, which is programmable by software to perform the functions described herein. Such software comprising instructions for execution may reside in a computer-readable medium comprising volatile and/or non-volatile memory, e.g., a random access memory, a read only memory, a programmable memory, a hard disk, a compact disc, or another form of physical storage medium readable, directly or indirectly, by a processing device.

Figure 6:
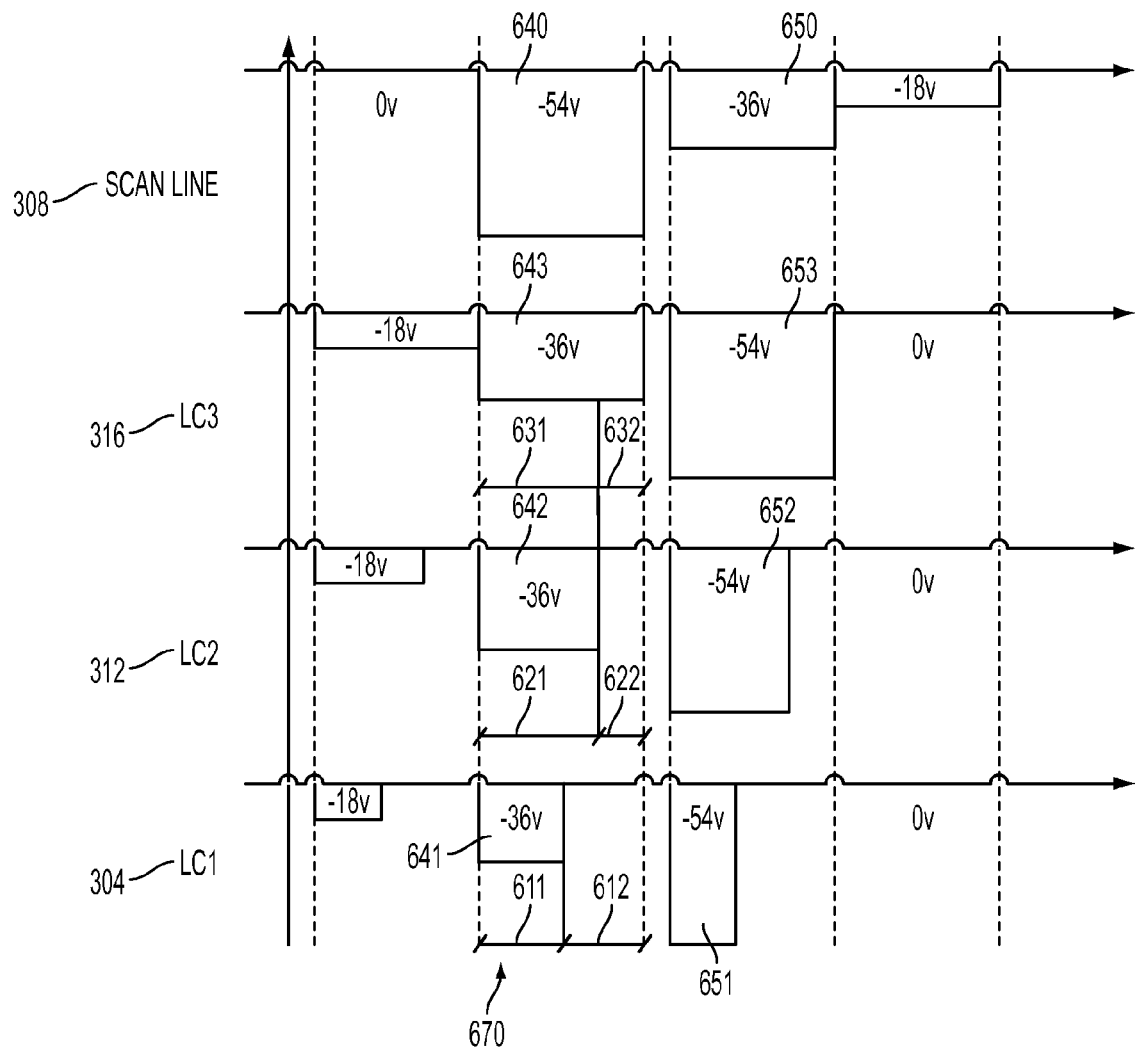
FIG. 6 show exemplary waveforms used to drive a display device in accordance with one or more embodiments.

FIG. 6 show exemplary waveforms used to drive the display device, such as display device 400, in accordance with one or more embodiments. For the sake of simplicity, the waveforms in FIG. 6 are given only for one pixel, e.g., pixel 1 with sub-pixels R1, G1, B1. For the same reason, initial pulse(s) 333 is omitted from FIG. 6.

As discussed above with respect to the specific numeric example with reference to FIG. 5, when the liquid crystal layers have different reflectance-voltage characteristics, the writing and/or scanning and/or auxiliary pulses having different voltages are applied to the respective electrode layers to avoid cross-talk either between adjacent pixels/sub-pixels or between liquid crystal layers. A driving method and circuitry (such as scanning and/or addressing circuitry 500) using such different voltages are generally complex and/or require high computing power. Embodiments using the waveforms exemplarily shown in FIG. 6 provide a simplified method and circuitry that allow writing and/or scanning and/or auxiliary pulses of the same voltage to be applied to the respective electrode layers. In some embodiments, all liquid crystal layers are addressed (i.e., driven) concurrently, i.e., in the same sub-frame period that is previously required to drive one or two liquid crystal layers. Such embodiments dramatically cut down the driving time, e.g., in a three liquid crystal layer display 300 or 400, to about one-third of that required for driving display device 300 or one-half of that required for driving display device 400.

Specifically, after an initialization or reset period using pulses similar to initial pulse(s) 333, a scanning pulse 640 is applied to the scan lines (or row electrodes) of electrode layers 308 to select all sub-pixels G1, B1, R1 of pixel 1. Writing pulses 641, 642, 643 are also placed on the respective electrode layers 304, 312, 316 of LC1, LC2 and LC3, respectively.

With respect to sub-pixel B1 of LC1, during a first interval 611 corresponding to the pulse width of writing pulse 641, the voltage placed across LC1 (e.g., 18V=54V−36V) is lower than the threshold voltage of LC1 and, hence, insufficient to change the reflectance state of LC1 in sub-pixel B1. However, during the subsequent second interval 612 which corresponds to the difference between the pulse width of scanning pulse 640 and writing pulse 641, the voltage placed across LC1 (e.g., 54V =54V−0V) is higher than the threshold voltage of LC1 and, hence, sufficient to change the reflectance state of LC1 in sub-pixel B1 toward the focal conic state. The pulse power during the second interval 612 determines how much the reflectance state of LC1 in sub-pixel B1 will change, and corresponds to the desired gray scale level of the blue color to be displayed.

Likewise, sub-pixel G1 of LC2 maintains its reflectance state during a first interval 621 corresponding to the pulse width of writing pulse 642, and changes its reflectance state during a second interval 622 which corresponds to the difference between the pulse width of scanning pulse 640 and writing pulse 642. The pulse power during the second interval 622 determines how much the reflectance state of LC2 in sub-pixel G1 will change, and corresponds to the desired gray scale level of the green color to be displayed.

In sub-pixel R1 of LC3, during a first interval 631 corresponding to the pulse width of writing pulse 642, the voltage placed across LC3 (e.g., 0V=36V−36V) is lower than the threshold voltage of LC3 and, hence, insufficient to change the reflectance state of LC3 in sub-pixel R1. However, during the subsequent second interval 632 which corresponds to the difference between the pulse width of writing pulses 642 and 643, the voltage placed across LC3 (e.g., 36V=36V−0V) is higher than the threshold voltage of LC3 and, hence, sufficient to change the reflectance state of LC3 in sub-pixel R1 toward the focal conic state. The pulse power during the second interval 632 determines how much the reflectance state of LC3 in sub-pixel R1 will change, and corresponds to the desired gray scale level of the red color to be displayed. Thus, all liquid crystal layers are addressed in a single scanning period corresponding to the pulse width of scanning pulse 640.

In some embodiments, if the desired gray scale levels are not reached within the single scanning period, the reflectance states, and hence, gray scale levels are further adjusted with auxiliary pulses 650-653 in a similar manner.

Since all liquid crystal layers are addressed in the same scanning period, no cross-talk issues arise. Differences in voltage and/or pulse width are used to adjust the reflectance state(s) of one or more of the liquid crystal layers instead.

In one or more embodiments, it is not necessary that scanning pulse 640 has the widest pulse width, or that all pulses 640-643 and/or 650-653 have their rising edges at the same time as exemplified shown at 670 in FIG. 6, or that all pulses overlap each other, or that writing pulse 643 and scanning pulse 640 have the same pulse width etc. It is sufficient that the power of the non-overlapping pulse portions, e.g., 612, 622, 632, generates appropriate gray scale levels in the respective liquid crystal layers. Thus, one or more of pulses 640-643 and/or 650-653 can occur before and/or or end after scanning pulse 640, and/or be placed completely within another pulse to create therebetween two non-overlapping pulse portions. In some embodiments, the voltages of pulses 641-643 and/or 651-653 are different. The driving technique of FIG. 6, in one or more embodiments, is combined in one or more aspects with that of FIG. 4.

In one or more embodiments, one or more of pulses 640-643 and 650-653 comprises a series of pulses of smaller pulse width. The repetition rate of such series of pulses and/or their pulse widths define the effective pulse width of the one or more of pulses 640-643 and 650-653. By varying the repetition rate of such series of pulses and/or their pulse widths, the effective pulse width of the one or more of pulses 640-643 and 650-653 can be adjusted and, hence, the respective gray scale level(s).

Figure 7:
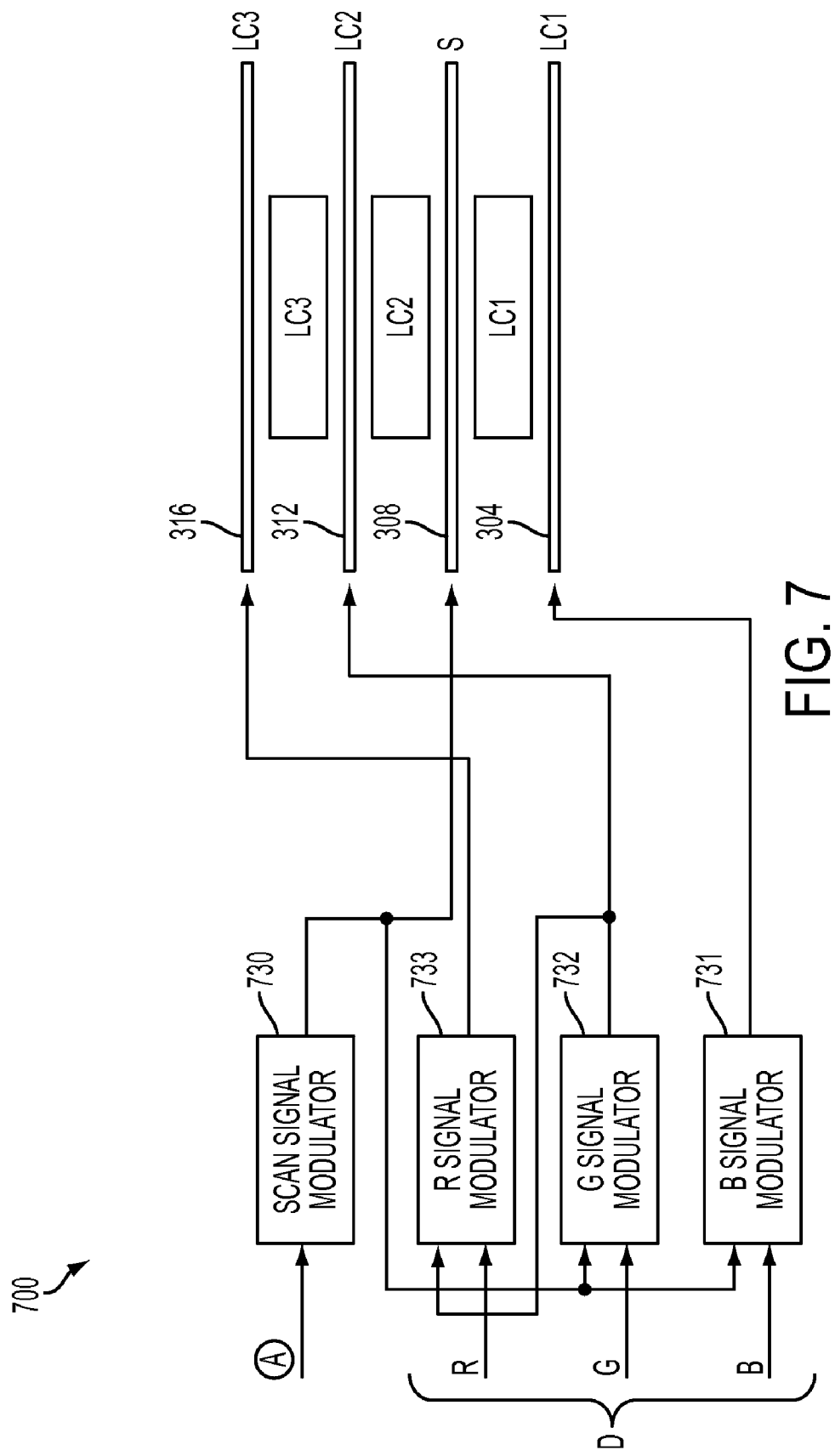
FIG. 7 is a schematic view showing scanning and/or addressing circuitry in accordance with one or more embodiments.

FIG. 7 is a schematic view showing scanning and/or addressing circuitry 700 which, in accordance with one or more embodiments, comprises scan signal modulator 730, and R, G, B signal modulators 733-731. Circuitry 700 is coupled to receive image signals from an external source, e.g., a graphic card of a computer or a tuner of a TV etc. The image signals are similar to those discussed with respect to FIG. 1, e.g., scanning signals S and data signals D, the latter comprising information on gray scale levels of various colors, e.g., R-G-B, to be displayed by the respective liquid crystal layers of display device 400.

Scan signal modulator 730 modulates the received scanning signals A and outputs scanning pulses, e.g., 640, 650, to electrode layer 308. In some embodiments, scan signal modulator 730 modulates the received scanning signals A based also on one or more of the data signals D for R and/or G and/or B colors.

The scanning signals before or after being modulated are, in some embodiments, supplied to in one or more of R, G, B signal modulators 733-731. In the specifically illustrated embodiment of FIG. 7, the modulated scanning pulses are entered into at least G, B signal modulators 732-731 for use in modulation of the respective G and B signals, to output writing pulses such as 641, 651, 642, 652 to the respective electrode layers 312, 304.

The modulated writing pulses for electrode layers 312 are also inputted into R signal modulator 733 for use in modulation of the respective R signal, to output writing pulses such as 643, 653, to the respective electrode layer 316.

Other arrangements are not excluded. For example, in some embodiments, one or more of the modulators 730-733 are configured to generate at least one of the scanning pulse 640 and/or writing pulses 641-643 as well as auxiliary pulses 650-653 as a series of smaller pulses, and to vary the repetition rate of such series of pulses and/or their pulse widths in accordance with the scanning signals A and/or the data signals D to achieve desired reflectance states, hence, gray scale levels of the respective liquid crystal layers.

In some embodiments, circuitry 700 comprises a hardware platform, such as chips or electronics or logics, which is hardwired to perform the functions described herein. In further embodiments, circuitry 700 comprises a hardware platform, such as a processor or chip coupled with a memory, which is programmable by software to perform the functions described herein. Such software comprising instructions for execution may reside in a computer-readable medium comprising volatile and/or non-volatile memory, e.g., a random access memory, a read only memory, a programmable memory, a hard disk, a compact disc, or another form of physical storage medium readable, directly or indirectly, by a processing device.

Figure 8:
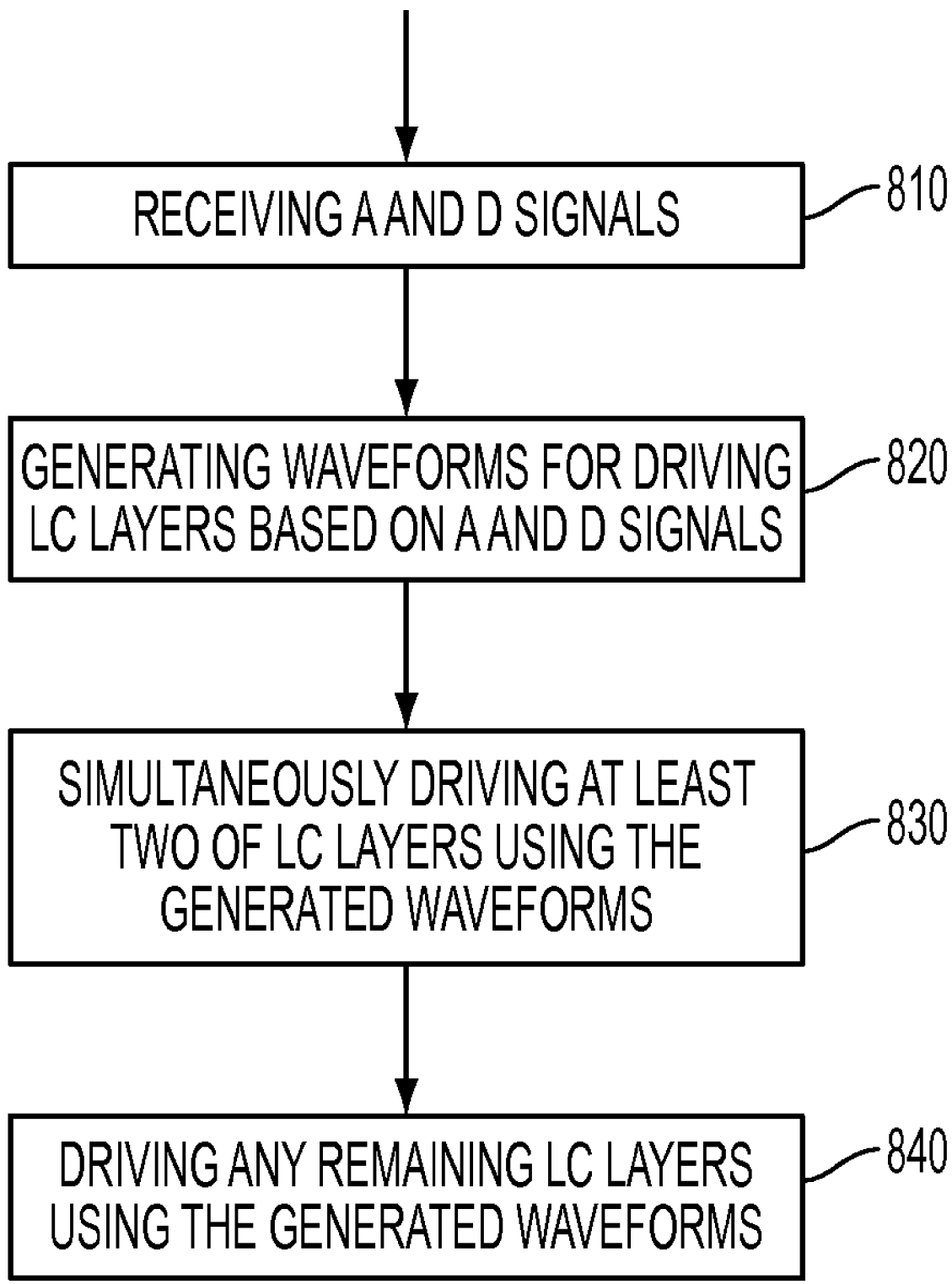
FIG. 8 is a flow chart of a driving method in accordance with one or more embodiments.

FIG. 8 is a flow chart of a driving method in accordance with one or more embodiments. In Step 810, image signals comprising scanning/address signals A and data signals D are received.

Waveforms for driving the respective liquid crystal layers are generated at Step 820. One or more of the writing waveforms on column electrodes of electrode layers 304, 312 are determined based not only on the desired gray scale levels of the respective colors, but also on the scanning/address signals A, e.g., scanning waveforms to be supplied to row electrodes of electrode layers 308, 316. The writing waveforms and/or scanning waveforms are generated taking into account that at least two of the liquid crystal layers will be driven together.

At Step 830, at least two of the liquid crystal layers are addressed simultaneously. The term "simultaneously" does not necessarily require that the liquid crystal layers are to be addressed at the exact same timings. Rather, it is intended to mean that the liquid crystal layers are completely addressed within the same sub-frame period that is required to completely address each liquid crystal layer individually.

At Step 840, any remaining liquid crystal layers that have not been addressed are addressed either together or sequentially. The order of Steps 830 and 840 is reversed in some embodiments.

In the disclosed embodiments, cholesteric liquid crystal materials are used in the context of a reflective display device that uses external light, e.g., ambient light, to display images. Other types of liquid crystal display, such as transmissive or trans-reflective liquid crystal displays, can be used in accordance with other embodiments.

What is claimed is:
1. A display device, comprising:
a substrate;
a first driving electrode layer on the substrate;
a first display material layer on the first electrode layer;
a common electrode layer on the first display material layer;

a second display material layer on the common electrode layer; a second driving electrode layer on the second display material layer; and a controller coupled to said first and second driving electrode layers and the common electrode layer for concurrently driving the first and second display material layers by:

based on image signals inputted for the first and second display material layers, generating first and second writing waveforms for the first and second driving electrode layers, respectively, and a scanning waveform for the common electrode layer;

adjusting at least one of the generated waveforms based on at least another one of the generated waveforms for at least one of cross-talk prevention or image quality adjustment; and placing the adjusted and generated waveforms on the respective electrode layers to concurrently drive the first and second display material layers while achieving said at least one of cross-talk prevention or image quality adjustment;

wherein the controller is configured to generate a writing pulse for each of the first and second writing waveforms and a scanning pulse for the scanning waveform of a voltage sufficient for causing the respective display material layer being driven to change an initial optical state thereof, wherein the writing or scanning pulses of the waveforms corresponding to two adjacent electrode layers partially overlap each other in time, wherein said overlapped pulses include either a writing pulse with a scanning pulse or a writing pulse with a writing pulse; and based on an effective pulse width of the writing pulse or scanning pulse of the waveform corresponding to one of said two electrode layers, adjust an effective pulse width of the writing pulse or scanning pulse of the waveform corresponding to the other of said two electrode layers to drive, during a non-overlapping period of the writing or scanning pulses of the waveforms corresponding to said two electrode layers, the display material layer between said two electrode layers from the initial optical state to a target optical state corresponding to the image signals inputted for said display material layer.

2. The display device of claim 1, further comprising a third display material layer; and a third driving electrode layer on the third display material layer and coupled to the controller which is further configured for, based on image signals inputted for the third display material layer, generating a third writing waveform for the third driving electrode layer;

adjusting at least one of (i) the third writing waveform or (ii) at least one of the waveforms placed on the first and second driving electrode layers and the common electrode layer based on at least one another waveform for said at least one of cross-talk prevention or image quality adjustment; and placing the third writing waveform on the third electrode layer.

3. The display device of claim 2, wherein at least one of said display material layers comprises a cholesteric liquid crystal material having a threshold voltage corresponding to the initial optical state of said cholesteric liquid crystal material.

4. The display device of claim 2, wherein said controller is further configured for adjusting at least one of the waveforms to include one or more auxiliary pulses which are coincident in time with the writing pulse or scanning pulse of another waveform and which define, together with the writing pulse or scanning pulse of said another waveform and across at least one display material layer that is not being driven, voltages insufficient to change the initial optical state of said at least one display material layer, thereby preventing cross talk from the display material layer being driven to said at least one display material layer.

5. The display device of claim 4, wherein said auxiliary pulses comprise a series of alternatingly arranged low and high pulses selected based on a threshold voltage of the respective display material layer.

6. The display device of claim 4, further comprising a switch for switching the scanning waveform between the common electrode layer and the third electrode layer depending on whether the first and second display material layers are being addressed or the third display material layer is being addressed.

7. The display device of claim 2, wherein said controller is further configured for generating for each of the waveforms an auxiliary pulse, wherein the auxiliary pulses of the waveforms corresponding to two adjacent electrode layers partially overlap each other in time, and adjusting an effective pulse width of the auxiliary pulse of the waveform corresponding to at least one of said two adjacent electrode layers to drive the display material layer between said adjacent electrode layers to the target optical state during a non-overlapping period of the auxiliary pulses of the waveforms corresponding to said two electrode layers.

8. The display device of claim 2, wherein said controller is further configured for concurrently driving all display material layers of the display device.

9. The display device of claim 1, wherein at least one said writing pulse or scanning pulse comprises a series of pulses, and the controller is configured for adjusting a pulse width of the pulses in said series to thereby adjust the effective pulse width of the writing pulse or scanning pulse.

10. The display device of claim 1, wherein the writing pulses or scanning pulses of all said electrode layers have the same voltage.

11. The display device of claim 1, wherein at least one said writing pulse or scanning pulse comprises a series of pulses, and the controller is configured for adjusting a repetition rate of the pulses in said series to thereby adjust the effective pulse width of the writing pulse or scanning pulse.

12. The display device of claim 1, wherein, during an overlapping period of the writing or scanning pulses of the waveforms corresponding to said two electrode layers, the controller is configured to control a voltage across the display material layer between said two electrode layers to be insufficient for the display material layer to change the initial optical state thereof.

13. A controller for driving a display device that comprises a substrate, a first driving electrode layer on the substrate, a first display material layer on the first electrode layer, a common electrode layer on the first display material layer, a second display material layer on the common electrode layer, a second driving electrode layer on the second display material layer, wherein the controller is adapted to be coupled to said first and second driving electrode layers and the common electrode layer and configured for concurrently driving the first and second display material layers by,
based on image signals inputted for the first and second display material layers, generating first and second writing waveforms for the first and second driving electrode layers, respectively, and a scanning waveform for the common electrode layer;
adjusting at least one of the generated waveforms based on at least another one of the generated waveforms for at least one of cross-talk prevention or image quality adjustment; and
placing the adjusted and generated waveforms on the respective electrode layers to concurrently drive the first and second display material layers while achieving said at least one of cross-talk prevention or image quality adjustment;
wherein the controller is configured to
generate a writing pulse for each of the first and second writing waveforms and a scanning pulse for the scanning waveform of a voltage sufficient for causing the respective display material layer being driven to change an initial optical state thereof, wherein the writing or scanning pulses of the waveforms corresponding to two adjacent electrode layers partially overlap each other in time, wherein said overlapped pulses include either a writing pulse with a scanning pulse or a writing pulse with a writing pulse;
based on an effective pulse width of the writing pulse or scanning pulse of the waveform corresponding to one of said two electrode layers, adjust an effective pulse width of the writing pulse or scanning pulse of the waveform corresponding to the other of said two electrode layers to drive, during a non-overlapping period of the writing or scanning pulses of the waveforms corresponding to said two electrode layers, the display material layer between said two electrode layers from the initial optical state to a target optical state corresponding to the image signals inputted for said display material layer.

14. A method of driving a display device that comprises a substrate, a first driving electrode layer on the substrate, a first display material layer on the first electrode layer, a common electrode layer on the first display material layer, a second display material layer on the common electrode layer, a second driving electrode layer on the second display material layer, said method comprising:
based on image signals inputted for the first and second display material layers, generating first and second writing waveforms for the first and second driving electrode layers, respectively, and a scanning waveform for the common electrode layer;
adjusting at least one of the generated waveforms based on at least another one of the generated waveforms for at least one of cross-talk prevention or image quality adjustment; and placing the adjusted and generated waveforms on the respective electrode layers to concurrently drive the first and second display material layers while achieving said at least one of cross-talk prevention or image quality adjustment;
wherein
said generating comprises generating a writing pulse for each of the first and second writing waveforms and a scanning pulse for the scanning waveform of a voltage sufficient for causing the respective display material layer being driven to change an initial optical state thereof, wherein the writing or scanning pulses of the waveforms corresponding to two adjacent electrode layers partially overlap each other in time, wherein said overlapped pulses include either a writing pulse with a scanning pulse or a writing pulse with a writing pulse, and
said adjusting comprises, based on an effective pulse width of the writing pulse or scanning pulse of the waveform corresponding to one of said two electrode layers, adjusting an effective pulse width of the writing pulse or scanning pulse of the waveform corresponding to the other of said two electrode layers to drive, during a non-overlapping period of the writing or scanning pulses of the waveforms corresponding to said two electrode layers, the display material layer between said two electrode layers from the initial optical state to a target optical state corresponding to the image signals inputted for said display material layer.

15. The method of claim 14, wherein the display device further comprises a third display material layer, and a third driving electrode layer on the third display material layer, said method further comprising:
based on image signals inputted for the third display material layer, generating a third writing waveform for the third driving electrode layer;
adjusting at least one of (i) the third writing waveform or (ii) at least one of the waveforms placed on the first and second driving electrode layers and the common electrode layer based on at least one another waveform for said at least one of cross-talk prevention or image quality adjustment; and
placing the third writing waveform on the third electrode layer.

16. The method of claim 15, wherein at least one of said display material layers comprises a cholesteric liquid crystal material having a threshold voltage corresponding to the initial optical state of said cholesteric liquid crystal material.

17. The method of claim 15, wherein:
said adjusting further comprises adjusting at least one of the waveforms to include one or more auxiliary pulses which are coincident in time with the writing pulse or scanning pulse of another waveform and which define, together with the writing pulse or scanning pulse of said another waveform and across at least one display material layer that is not being driven, voltages insufficient to change the initial optical state of said at least one display material layer, thereby preventing cross talk from the display material layer being driven to said at least one display material layer.

18. The method of claim 15, further comprising concurrently driving all display material layers of the display device.

19. The method of claim 14, wherein at least one said writing pulse or scanning pulse comprises a series of pulses, said method further comprising:
adjusting a pulse width of the pulses in said series to thereby adjust the effective pulse width of the writing pulse or scanning pulse.

20. The method of claim 14, wherein at least one said writing pulse or scanning pulse comprises a series of pulses, said method further comprising:
adjusting a repetition rate of the pulses in said series to thereby adjust the effective pulse width of the writing pulse or scanning pulse.

21. A non-transitory computer-readable medium containing therein instructions which, when executed by a processor, cause a controller the processor to perform a method of driving a display device that comprises a substrate, a first driving electrode layer on the substrate, a first display material layer on the first electrode layer, a common electrode layer on the first display material layer, a second display material layer on the common electrode layer, a second driving electrode layer on the second display material layer, said method comprising:

- based on image signals inputted for the first and second display material layers, generating first and second writing waveforms for the first and second driving electrode layers, respectively, and a scanning waveform for the common electrode layer;
- adjusting at least one of the generated waveforms based on at least another one of the generated waveforms for at least one of cross-talk prevention or image quality adjustment; and
- placing the adjusted and generated waveforms on the respective electrode layers to concurrently drive the first and second display material layers while achieving said at least one of cross-talk prevention or image quality adjustment;
- wherein
- said generating comprises generating a writing pulse for each of the first and second writing waveforms and a scanning pulse for the scanning waveform of a voltage sufficient for causing the respective display material layer being driven to change an initial optical state thereof, wherein the writing or scanning pulses of the waveforms corresponding to two adjacent electrode layers partially overlap each other in time, wherein said overlapped pulses include either a writing pulse with a scanning pulse or a writing pulse with a writing pulse, and
- said adjusting comprises, based on an effective pulse width of the writing pulse or scanning pulse of the waveform corresponding to one of said two electrode layers, adjusting an effective pulse width of the writing pulse or scanning pulse of the waveform corresponding to the other of said two electrode layers to drive, during a non-overlapping period of the writing or scanning pulses of the waveforms corresponding to said two electrode layers, the display material layer between said two electrode layers from the initial optical state to a target optical state corresponding to the image signals inputted for said display material layer.

* * * * *